US011354000B1

(12) United States Patent
Shen et al.

(10) Patent No.: US 11,354,000 B1
(45) Date of Patent: Jun. 7, 2022

(54) SENSING DEVICE WITH EMBEDDED NOISE MEASUREMENT

(71) Applicant: Synaptics Incorporated, San Jose, CA (US)

(72) Inventors: Guozhong Shen, San Jose, CA (US); Chunbo Liu, San Jose, CA (US)

(73) Assignee: Synaptics Incorporated, San Jose, CA (US)

( * ) Notice: Subject to any disclaimer, the term of this patent is extended or adjusted under 35 U.S.C. 154(b) by 0 days.

(21) Appl. No.: 17/345,658

(22) Filed: Jun. 11, 2021

(51) Int. Cl.
*G06F 3/044* (2006.01)
*G06F 3/041* (2006.01)

(52) U.S. Cl.
CPC .......... *G06F 3/0443* (2019.05); *G06F 3/0412* (2013.01)

(58) Field of Classification Search
CPC .............................. G06F 3/0443; G06F 3/0412
USPC .................................................. 345/173, 174
See application file for complete search history.

(56) References Cited

U.S. PATENT DOCUMENTS

| 8,766,950 | B1 | 7/2014 | Morein et al. |
| 10,133,421 | B2 | 11/2018 | Shepelev |
| 10,146,388 | B2 | 12/2018 | Reynolds et al. |
| 10,838,547 | B1* | 11/2020 | Shen ...................... G06F 3/0412 |
| 2008/0162997 | A1* | 7/2008 | Vu ....................... G06F 3/03545 714/27 |
| 2015/0309658 | A1* | 10/2015 | Stevenson ........... G06F 3/04184 345/176 |

* cited by examiner

*Primary Examiner* — Calvin C Ma
(74) *Attorney, Agent, or Firm* — Leydig, Voit & Mayer, Ltd.

(57) ABSTRACT

A processing system and method are provided. The processing system includes a sensor circuit that drives, during a first sensing period, a first plurality of sensor electrodes with first sensing signals, receives first resulting signals from the first plurality of sensor electrodes, and mixes the first resulting signals with a first mixer signal to generate a first mixed signal, wherein the first mixer signal has a first phase and the first mixed signal corresponds to at least a portion of a capacitive image. The processing system also includes a noise measurement circuit that receives second resulting signals from a second plurality of sensor electrodes, and mixes the second resulting signals with a second mixer signal to generate a second mixed signal, wherein the second mixer signal has a second phase and the second mixed signal corresponds to a first noise measurement.

20 Claims, 7 Drawing Sheets

SENSING DEVICE WITH EMBEDDED NOISE MEASUREMENT

FIELD

The disclosure herein is generally related to electronic devices, and more specifically, to a capacitive sensing device.

BACKGROUND

Input devices including proximity sensor devices, e.g., capacitive sensor devices, may be used in a variety of electronic systems. A proximity sensor device may include a sensing area, demarked by a surface, in which the proximity sensor device determines the presence, location, force and/or motion of one or more input objects. Proximity sensor devices may be used to provide interfaces for the electronic system. For example, proximity sensor devices may be used as input devices for larger computing systems, such as touchpads integrated in, or peripheral to, notebook computers, desktop computers, automotive multimedia systems, or internet of things (IoT) devices. Proximity sensor devices may also often be used in smaller computing systems, such as touch screens integrated in cellular phones.

Proximity sensor devices, like other electronic devices, can be affected by noise. For example, noise can interfere with the ability of the proximity sensor device to accurately detect the presence, location or motion of an input object. It would be desirable to detect and mitigate noise in proximity sensor devices.

SUMMARY

In one embodiment, a method for operating sensor electrodes in an input device is provided. The method includes driving, during a first sensing period, a first plurality of sensor electrodes with first sensing signals; receiving first resulting signals from the first plurality of sensor electrodes and mixing the first resulting signals with a first mixer signal to generate a first mixed signal. The first mixer signal has a first phase and the first mixed signal corresponds to at least a portion of a capacitive image. The method also includes receiving second resulting signals from a second plurality of sensor electrodes and mixing the second resulting signals with a second mixer signal to generate a second mixed signal. The second mixer signal has a second phase and the second mixed signal corresponds to a first noise measurement.

In another embodiment, a processing system is provided. The processing system includes a sensor circuit. The sensor circuit is configured to: drive, during a first sensing period, a first plurality of sensor electrodes with first sensing signals; receive first resulting signals from the first plurality of sensor electrodes, and mix the first resulting signals with a first mixer signal to generate a first mixed signal. The first mixer signal has a first phase and the first mixed signal corresponds to at least a portion of a capacitive image. The processing system further includes a noise measurement circuit. The noise measurement circuit is configured to: receive second resulting signals from a second plurality of sensor electrodes, and mix the second resulting signals with a second mixer signal to generate a second mixed signal. The second mixer signal has a second phase and the second mixed signal corresponds to a first noise measurement.

In yet another embodiment, an input device is provided. The input device includes a sensing area having a plurality of sensing regions and a sensor circuit. The sensor circuit is configured to drive, during a first sensing period, a first plurality of sensor electrodes in a first region of the plurality of regions with first sensing signals; receive first resulting signals from the first plurality of sensor electrodes, and mix the first resulting signals with a first mixer signal to generate a first mixed signal. The first mixer signal has a first phase and the first mixed signal corresponds to at least a portion of a capacitive image. The sensor circuit further includes a noise measurement circuit. The noise measurement circuit is configured to receive second resulting signals from a second plurality of sensor electrodes in a second region of the plurality of regions, and mix the second resulting signals with a second mixer signal to generate a second mixed signal. The second mixer signal has a second phase and the second mixed signal corresponds to a first noise measurement.

DETAILED DESCRIPTION

The following detailed description is merely exemplary in nature and is not intended to limit the disclosure or the application and uses of disclosed embodiments and methods. Furthermore, there is no intention to be bound by any expressed or implied theory presented in the preceding background, summary, brief description of the drawings or the description that follows.

Sensor electrodes in an input device may be subject to noise generated from the input device or external sources. Systems and methods described herein provide a way to measure noise using a serial in-band quadrature (IQ) noise measurement technique. The systems and methods provide for partial or full guarding to minimize unwanted deleterious capacitive coupling. As will become apparent from the description that follows, the systems and methods eliminate or minimize the need for a costly dedicated temporal resource for noise measurement. In certain embodiments, the systems and methods eliminate or minimize relatively high current and power consumption that can result from, for example, capacitive coupling between sensor electrodes and display (e.g., LCD) components such as source and gate lines.

Figure 1:
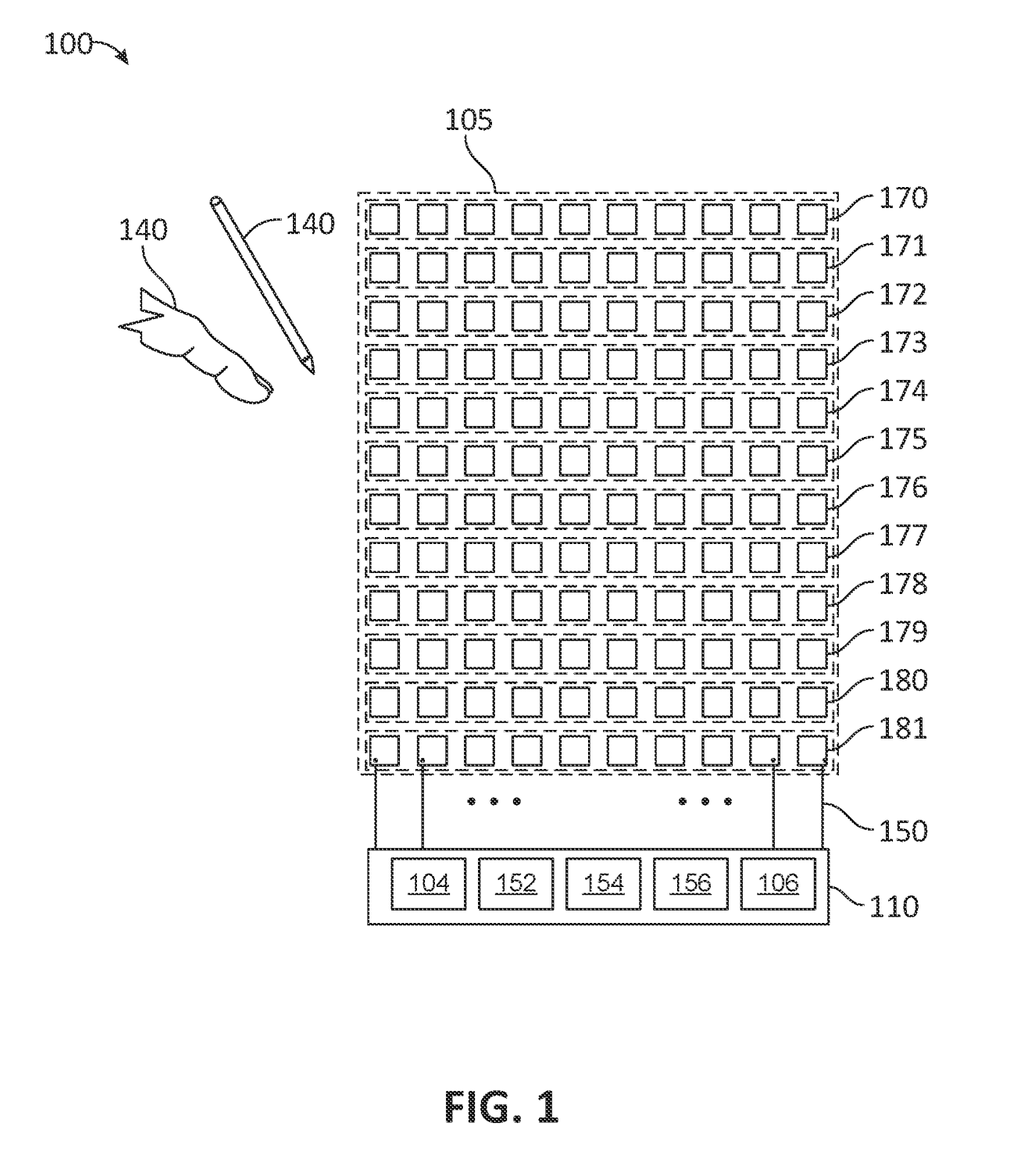
FIG. 1 is a block diagram of an input device, according to one or more embodiments.

FIG. 1 illustrates input device 100 configured to measure and mitigate noise during capacitive sensing. The input device 100 may be configured to provide input to an electronic system (not shown). Some non-limiting examples of electronic systems include desktop computers, laptop computers, netbook computers, tablets, terminals, kiosks, cellular phones, automotive multimedia centers and internet of things (IoT) devices, among others.

The input device 100 includes a processing system 110 and sensor electrodes 105. The processing system 110 operates the sensor electrodes 105 to detect one or more input objects 140 in a sensing area of the input device 100. Example input objects 140 include fingers and styli, as shown in FIG. 1.

The sensing area of the input device 100 encompasses any space above, around, in and/or near the input device 100 in which the input device 100 is able to detect user input, e.g., user input provided by one or more input objects 140.

The sensor electrodes 105 are coupled to the processing system 110 via traces 150. An exemplary pattern of the sensor electrodes 105 illustrated in FIG. 1 comprises an array of sensor electrodes 105 disposed in a plurality of rows and columns. In one example, the sensor electrodes 105 are disposed in rows, e.g., rows 170-181. It is contemplated that the sensor electrodes 105 may be arranged in other patterns, such as polar arrays, repeating patterns, non-repeating patterns, non-uniform arrays, or other suitable arrangement. The sensor electrodes 105 may have any suitable shape, such as circular, rectangular, diamond, star, square, nonconvex, convex, nonconcave concave, or other geometry.

The sensor electrodes 105 may be disposed in a common layer. For example, the sensor electrodes 105 may be disposed on a first side of a common substrate. In other embodiments, the sensor electrodes 105 may be disposed in two or more layers. For example, a portion of the sensor electrodes 105 may be disposed on a first layer and another portion of the sensor electrodes may be disposed on a second layer. The first and second layers may be disposed on different sides of a common substrate, or disposed on different substrates.

The sensor electrodes 105 may be comprised of a conductive material such as a metal mesh, indium tin oxide (ITO), or the like. Further, the sensor electrodes 105 are ohmically isolated from each other such that one or more insulators separate the sensor electrodes and prevent them from electrically shorting to each other.

The processing system 110 includes sensor circuitry 104. Further, the processing system 110 may include a determination circuit 106. The processing system 110 is configured to operate the sensor electrodes 105 to detect one or more input objects 140 in the sensing area of the input device 100. The processing system 110 fully or partially resides in one or more integrated circuit (IC) chips. For example, the processing system 110 may include a single IC chip. Alternatively, the processing system 110 includes multiple IC chips.

The sensor circuitry 104 is coupled to the sensor electrodes 105 via the routing traces 150 and is configured to drive the sensor electrodes 105 with sensing signals to detect one or more input objects 140 in the sensing area of the input device 100. The sensor circuitry 104 may also be configured to drive the sensor electrodes 105 with other signals, such as guarding signals as described further in connection with FIG. 3A and FIG. 3B.

The sensor circuitry 104 includes digital and/or analog circuitry. For example, the sensor circuitry 104 comprises transmitter (or driver) circuitry configured to drive sensing signals onto the sensor electrodes 105 and receiver circuitry to receive resulting signals from the sensor electrodes 105. The transmitter circuitry may include one or more amplifiers and/or one or more modulators configured to drive sensing signals on to the sensor electrodes 105.

The processing system 110 may include analog to digital converters (ADCs) 154, analog front ends (AFEs) 152 comprising, for example, integrators configured to receive resulting signals from the sensor electrodes 105. The processing system 110 may include one or more mixers 156 and mixer signals used to, for example, facilitate processing signals such as resulting signals and noise according to their phase. The ADCs 154, AFEs 152 and mixers 156 may be part of the sensor circuitry 104 or may form different circuits.

In one embodiment, the sensor circuitry 104 drives a first one or more of the sensor electrodes 105 with a transcapacitive sensing signal and receives a resulting signal with a second one or more of the sensor electrodes 105 to operate the sensor electrodes 105 for transcapacitive sensing. Operating the sensor electrodes 105 for transcapacitive sensing detects changes in capacitive coupling between sensor electrodes driven with a transcapacitive sensing signal and sensor electrodes operated as receiver electrodes. The capacitive coupling may be reduced when an input object (e.g., the input object 140) coupled to a system ground approaches the sensor electrodes. Driving the sensor electrodes 105 with transcapacitive sensing signals comprises modulating the sensor electrodes 105 relative to a reference voltage, e.g., system ground.

The transcapacitive sensing signal is a periodic or aperiodic signal that varies between two or more voltages. Further, the transcapacitive sensing signal has a frequency between 100 kHz and 1 MHz. In other embodiments, other frequencies may be utilized. The transcapacitive sensing signal may have a peak-to-peak amplitude in a range of about 1 V to about 10 V. However, in other embodiments, the transcapacitive sensing signal may have a peak-to-peak amplitude greater than about 10 V or less than 1 V. Additionally, the transcapacitive sensing signal may have a square waveform, a sinusoidal waveform, triangular waveform, a trapezoidal waveform, or a sawtooth waveform, among others.

In some embodiments, operating the sensor electrodes 105 to receive resulting signals comprises holding the sensor electrodes 105 at a substantially constant voltage or modulating the sensor electrodes 105 relative to the transcapacitive sensing signal. A resulting signal includes effect(s) corresponding to one or more transcapacitive sensing signals, and/or to one or more sources of environmental interference, e.g., other electromagnetic signals.

In one embodiment, the sensor circuitry 104 operates the sensor electrodes 105 for absolute capacitive sensing by driving a first one or more of the sensor electrodes 105 with an absolute capacitive sensing signal and receiving a resulting signal with the driven sensor electrodes. Operating the sensor electrodes 105 for absolute capacitive sensing detects changes in capacitive coupling between sensor electrodes driven with an absolute capacitive sensing signal and an input object (e.g., the input object 140). The capacitive coupling of the sensor electrodes 105 driven with the absolute capacitive sensing signal is altered when an input object (e.g., the input object 140) coupled to a system ground approaches the sensor electrodes.

The absolute capacitive sensing signal is a periodic or aperiodic signal that varies between two or more voltages. Further, the absolute capacitive sensing signal has a frequency between about 100 kHz and 1 MHz. In other embodiments, other frequencies may be utilized. Additionally, the absolute capacitive sensing signal may have a square waveform, a sinusoidal waveform, triangular waveform, a trapezoidal waveform, or a sawtooth waveform, among others. The absolute capacitive sensing signal may have a peak-to-peak amplitude in a range of about 1 V to about 10 V. However, in other embodiments, the absolute capacitive sensing signal may have a peak-to-peak amplitude greater than about 10 V or less than 1 V. In various embodiments, driving the sensor electrodes 105 with an absolute capacitive sensing signal comprises modulating the sensor electrodes 105. A resulting signal received while performing absolute capacitive sensing may comprise effect(s) corresponding to one or more absolute capacitive sensing signals, and/or to one or more sources of environmental interference, e.g., other electromagnetic signals. The absolute capacitive sensing signal may be the same or different from the transcapacitive sensing signal used in transcapacitance sensing.

The sensor circuitry 104 operates a first subset of the sensor electrodes 105 for absolute capacitive sensing. The first subset of the sensor electrodes 105 corresponds to one or more sensor electrodes 105 and may correspond to entire rows, e.g., rows 170, 171 referred to as a sensing region. The first subset of the sensor electrodes may correspond to two or more of the rows 170-181.

In certain embodiments, the sensor circuitry 104 drives a second subset of the sensor electrodes 105 with a guard signal. The second subset of the sensor electrodes 105 corresponds to one or more of the sensor electrodes 105 and may correspond to entire rows, e.g., rows 172, 173 referred to as guard channel(s) or region(s). In certain embodiments, the second subset of the sensor electrodes 105 comprises all remaining electrodes (e.g., all electrodes other than the first subset of electrodes), referred to as full guarding. In other embodiments, the second subset of the sensor electrodes comprises less than all remaining electrodes, referred to as partial guarding.

A sensor electrode driven with a guard signal may be referred to as a guarded sensor electrode or guard electrode. Driving a sensor electrode with a guard signal mitigates a voltage difference between the guarded sensor electrode and a sensor electrode driven with the absolute capacitive sensing signal in parallel. Driving the guard signal onto a first one or more sensor electrodes while driving the sensing signal onto a second one or more sensor electrodes results in little or no change in capacitance between the guarded sensor electrode(s) and the sensor electrode(s) driven with the absolute capacitive sensing signal.

The guard signal has at least one characteristic selected from a group of an amplitude, a phase, and a frequency in common with the absolute capacitive sensing signal. In one embodiment, one of an amplitude, phase, and frequency of the guard signal is in common with the absolute capacitive sensing signal. In another embodiment, the guard signal comprises an amplitude and phase or frequency in common with the absolute capacitive sensing signal. In one embodiment, the guard signal comprises a phase and amplitude or frequency in common with the absolute capacitive sensing signal. Alternatively, the guard signal comprises a frequency and amplitude or phase in common with the absolute capacitive sensing signal.

Additionally, the guard signal and the absolute capacitive sensing signal may have a common waveform shape. In one embodiment, the guard signal may be the same as the absolute capacitive sensing signal.

The sensor circuitry 104 reads noise signals received from a third subset of the sensor electrodes 105. The third subset of the sensor electrodes 105 may be adjacent to or spaced apart from the first subset of the sensor electrodes 105. The third subset of sensor electrodes 105 may be a multiple of the size of the first subset of sensor electrodes 105. For example, the third subset of sensor electrodes 105 may be twice the size as the first subset of sensor electrodes 105, three times the size of the first subset of sensor electrodes 105 or some other multiple. The third subset of sensor electrodes 105 may be same size as the first subset of sensor electrodes 105 or may be a fraction of the size of the first subset of sensor electrodes 105.

The determination circuit 106 receives the resulting signals from the sensor circuitry 104 and processes the resulting signals to determine changes in capacitive coupling of the sensor electrodes 105. The determination circuit 106 utilizes the changes in capacitive coupling of the sensor electrodes 105 to determine positional information of one or more input objects (e.g., the input object 140). The determination circuit 106 may perform other functions, such as measuring the amount of noise present in one or more regions of a sensing area and/or determining whether positional information has been corrupted or degraded by noise.

In one or more embodiments, measurements of the changes in capacitive coupling determined from the resulting signals received from the sensor electrodes 105 may be utilized by the determination circuit 106 to form a capacitive image. The resulting signals utilized to detect the changes in capacitive coupling are received during a capacitive frame. A capacitive frame may correspond to one or more capacitive images. Multiple capacitive images may be acquired over multiple time periods, and differences between the images used to derive information about an input object 140 in the sensing area of the input device 100. For example, successive capacitive images acquired over successive periods of time can be used to track the motion(s) of one or more input objects entering, exiting, and within the sensing area.

"Positional information" as used herein broadly encompasses absolute position, relative position, velocity, acceleration, and other types of spatial information in zero, one, two or three dimensions as appropriate. Exemplary "zero-dimensional" positional information includes near/far or contact/no contact information. Exemplary "one-dimensional" positional information includes positions along an axis. Exemplary "two-dimensional" positional information includes motions in a plane. Exemplary "three-dimensional" positional information includes instantaneous or average velocities in space. Further examples include other representations of spatial information. Historical data regarding one or more types of positional information may also be determined and/or stored, including, for example, historical data that tracks position, motion, or instantaneous velocity over time.

Figure 2:
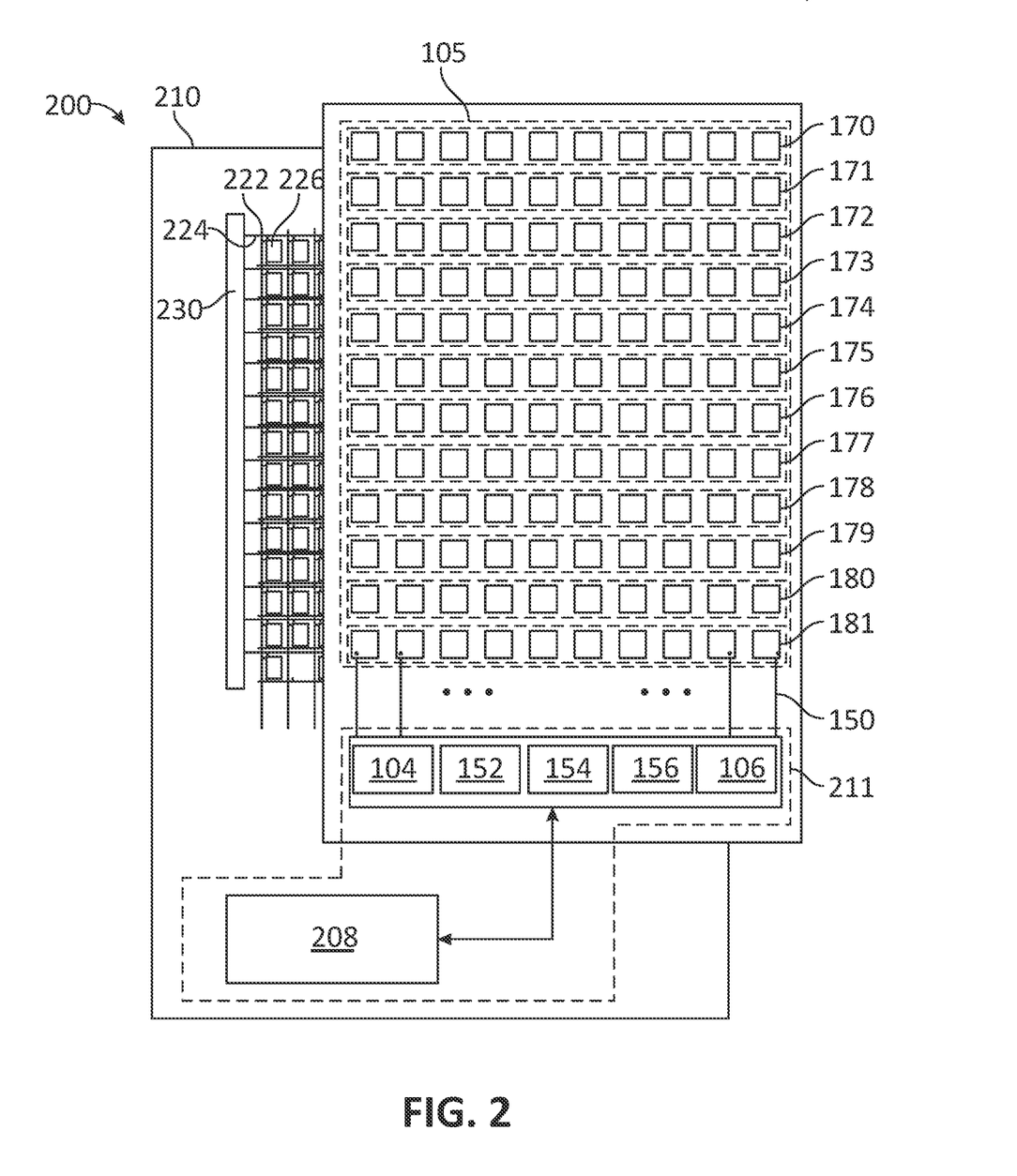
FIG. 2 is a block diagram of an input device, according to one or more embodiments.

FIG. 2 illustrates an example of the input device 100 wherein the input device is shown overlapped and/or integrated with a display of a display device 200. The display of the display device 200 may be any suitable type of display such as, for example, light emitting diode (LED), microLED, organic LED (OLED), microOLED, liquid crystal display (LCD), plasma, electroluminescence (EL), or other display technology.

The display device 200 includes a display panel 210 communicatively coupled with a display driver 208 and gate selection circuitry 230. The display panel 210 includes display electrodes that are driven to update subpixel electrodes 226 of the display panel 210. The display electrodes include data lines 222 and gate lines 224, among others.

The data lines 222 are coupled to the display driver 208 and the gate lines 224 are coupled to the gate selection circuitry 230. Each of the subpixel electrodes 226 is coupled to one of the gate lines 224 and one of the data lines 222. The gate selection circuitry 230 is configured to drive gate select and gate deselect signals onto the gate lines 224 to select (activate) and deselect (deactivate) corresponding subpixels for updating.

The display driver 208 includes display driver circuitry configured to drive the data lines 222 with subpixel data signals to update the selected subpixels electrodes 226 and update the display of the display device 200. For example, the display driver 208 may drive display update signals onto the data lines 222 during corresponding display updating periods.

The display driver 208 is configured to update the subpixel electrodes 226 to update an image displayed on the display panel 210 during display frames. The display frames may be updated, or refreshed, once about every 16 ms, generating a display refresh rate of about 60 Hz. In other embodiments, other display refresh rates may be employed. For example, the display refresh rate may be 90 Hz, 120 Hz, 140 Hz, or greater.

The display driver 208, the sensor circuitry 104, the determination circuit 106, the AFEs 152, the ADCs 154, and the mixers 156 may be part of a common processing system (e.g., the processing system 211). Alternatively, the display driver 208 may be part of a first processing system and the sensor circuitry 104, AFEs 152, the ADCs 154, the mixers 156, and the determination circuit 106 may be part of a second processing system. Further, the display driver 208, the sensor circuitry 104, the AFEs 152, the ADCs 154, the mixers 156 and the determination circuit 106 may be part of a common IC chip. Alternatively, one or more of these components may be disposed in a first IC chip and a second one or more of these components may be disposed on a second IC chip, etc. As an alternative, any of the sensor circuitry 104, AFEs 152, the ADCs 154, the mixers 156, and/or the determination circuit 106 may be one or more discrete circuits.

In various embodiments, the sensor circuitry 104 is configured to drive the sensor electrodes for capacitive sensing during a capacitive frame at a capacitive frame rate. In one embodiment, during each capacitive frame, each of the sensor electrode 105 is operated for absolute capacitive sensing. Further, each capacitive frame may include multiple periods during which different sensor electrodes 105 are operated for absolute capacitive sensing.

The "capacitive frame rate" (the rate at which successive capacitive images are acquired) may be the same or be different from that of the "display frame rate" (the rate at which the display image is updated, including refreshing the screen to redisplay the same image). In various embodiments, the capacitive frame rate is an integer multiple of the display frame rate. In other embodiments, the capacitive frame rate is a fractional multiple of the display frame rate. In yet further embodiments, the capacitive frame rate may be any fraction or multiple of the display frame rate. Further, the capacitive frame rate may be a rational fraction of the display rate (e.g., 1/2, 2/3, 1, 3/2, 2). In one or more embodiments, the display frame rate may change while the capacitive frame rate remains constant. In other embodiment, the display frame rate may remain constant while the capacitive frame rate is increased or decreased. Alternately, the capacitive frame rate may be unsynchronized from the display refresh rate or the capacitive frame rate may be a non-rational fraction of the display rate to minimize interference "beat frequencies" between the display updating and the input sensing.

In one or more embodiments, capacitive sensing (or input sensing) and display updating may occur during at least partially overlapping periods. For example, the sensor circuitry 104 is configured to operate the sensor electrodes 105 for capacitive sensing while the display driver 208 operates the gate lines 224 and data lines 222 to update an image displayed by the display panel 210. For example, updating the display panel 210 and operating the sensor electrodes 105 for capacitive sensing may be asynchronous with each other. Further, updating the display panel 210 and operating the sensor electrodes 105 for capacitive sensing may or may not be synchronized with each other.

In one or more embodiments, updating the display panel 210 and operating the sensor electrodes 105 for capacitive sensing may occur during non-overlapping periods. For example, updating the display panel 210 may occur during display update periods and operating the sensor electrodes 105 for capacitive sensing may occur during non-display update periods. The non-display update periods may be a blanking period that occurs between the last line of a display frame and the first line of the following display frame (e.g., during a vertical blanking period). Further, the non-display update periods may occur between display line update periods for two consecutive display lines of a display frame and are at least as long in time as the display line update period. In such embodiments, the non-display update period may be referred to as a long horizontal blanking period or long h-blanking period, where the blanking period occurs between two display line updating periods within a display frame and is at least as long as a display line update period.

Figure 3A:
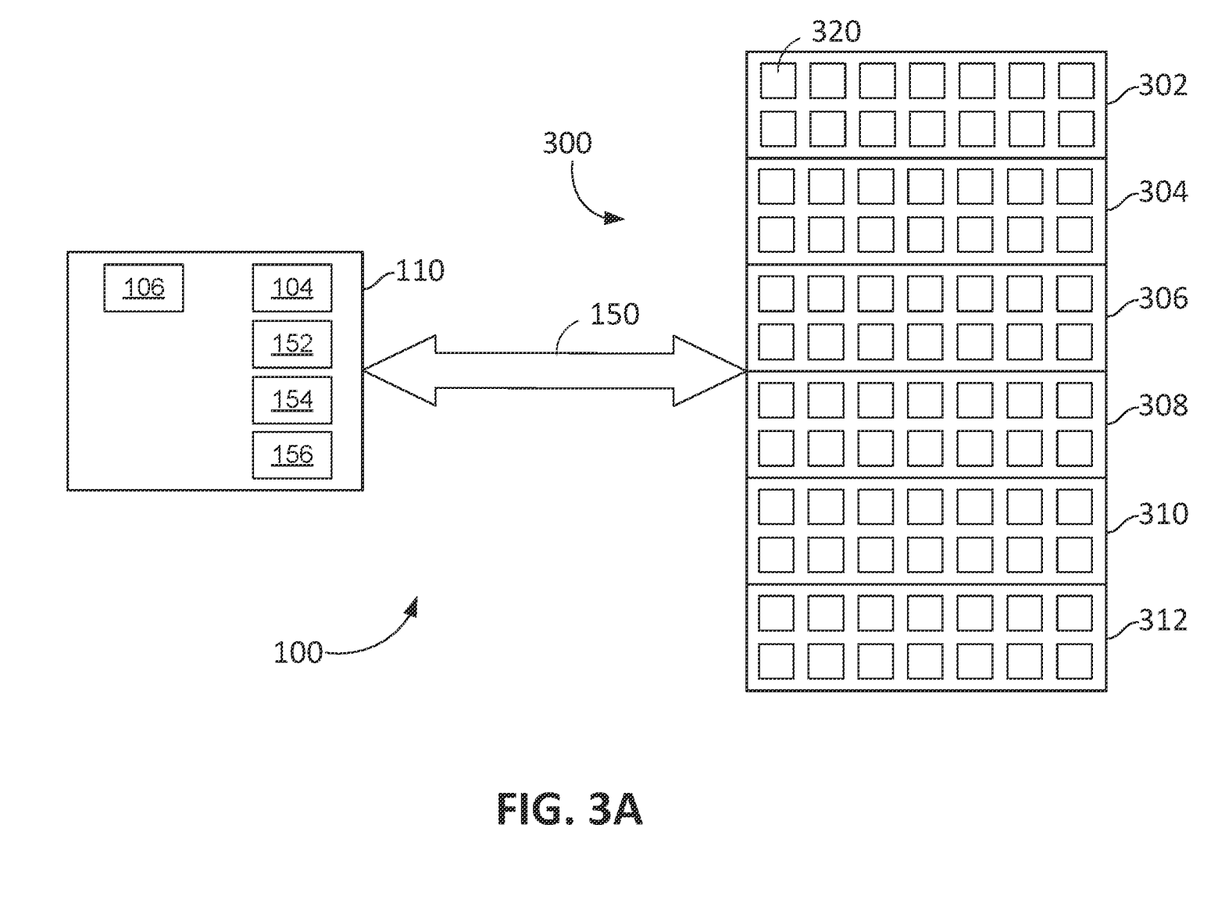
FIG. 3A is a block diagram of an input device illustrating regions of a sensing area, according to one or more embodiments.

FIG. 3A illustrates input device 100 configured for capacitive sensing and noise measurement according to certain embodiments. As previously described, the input device 100 includes the processing system 110 with the sensor circuitry 104 and the determination circuit 106. The processing system 110 may also include one or more of the AFEs 152, ADCs 154 and/or mixers 156. These processing system components may be separate circuits or may form a single circuit. As one example, the AFEs 152, ADCs 154 and mixers 156 may form part of the sensor circuitry 104. The processing system 110, sensor circuitry 104, determination circuit 106, AFEs 152, ADCs 154 and mixers 156 may be formed on a single IC, may be distributed amongst multiple ICs or may be formed as discrete circuits.

A plurality of sensor electrodes, e.g., sensor electrodes 320, are provided in sensing area 300. The plurality of sensor electrodes 320 are depicted in a plurality of regions 302-312 of the sensing area 300. Each of the regions 302-312 is depicted as having two rows of sensor electrodes, although it will be understood that the sensing regions may have a single sensor electrode or a plurality of sensor electrodes and the electrodes may be arranged in any suitable pattern as previously described. The regions 302-312 may have equal numbers of the sensor electrodes 320. Alternatively, the regions 302-312 may have an unequal number of the sensor electrodes 320. In the example, the sensing area 300 has the six regions 302-312, but it will be understood that any suitable number of regions may be employed.

The sensor electrodes 320 are communicatively coupled to the sensor circuitry 104 of the processing system 110. Such coupling incudes, for example, traces 150 and additional interface components such as the AFEs 152, ADCs 154, and/or mixers 156. Although not shown, one or more multiplexers may be employed to reduce the overall circuitry needed to interface the sensor electrodes 320 of the various regions 302-312 to sensor circuitry 104.

The sensor circuitry 104 drives the sensor electrodes 320 of one or more regions 302-312 with sensing signals and receives corresponding resulting signals from the sensor electrodes 320 in the one or more driven regions to detect presence and position of an input object, e.g., input object 140. Regions driven with the sensing signals to detect an input object are referred to herein as active regions or active channels. The sensor circuitry 104 also receives signals from one or more regions, other than the active regions, to measure noise. Regions used to receive signals for noise measurement are referred to herein as noise measurement regions.

In certain embodiments, the sensor circuitry 104 drives one or more regions (or portions thereof), other than active regions, with a guard signal to, for example, reduce interference cause by unwanted capacitive coupling. In the embodiment of FIG. 3A, full guarding is employed wherein the guard signal is applied to the electrodes in all, or substantially all, regions except for the active region. For example, if the active region is region 302, the guard signal is applied to the sensor electrodes in regions 304-312. As another example, if the active region is region 306, the guard signal is applied to the sensor electrodes in regions 302-304 and regions 308-312. Full guarding may have advantages over partial guarding in certain embodiments. For example, for an input device 100 where gate and source lines of the display are relatively close to the sensor electrodes, e.g., within a few μm, the input device can experience large capacitive coupling causing a relatively large current draw and corresponding large power consumption when partial guarding is employed. The relatively large current draw can be reduced by using full guarding.

Figure 3B:
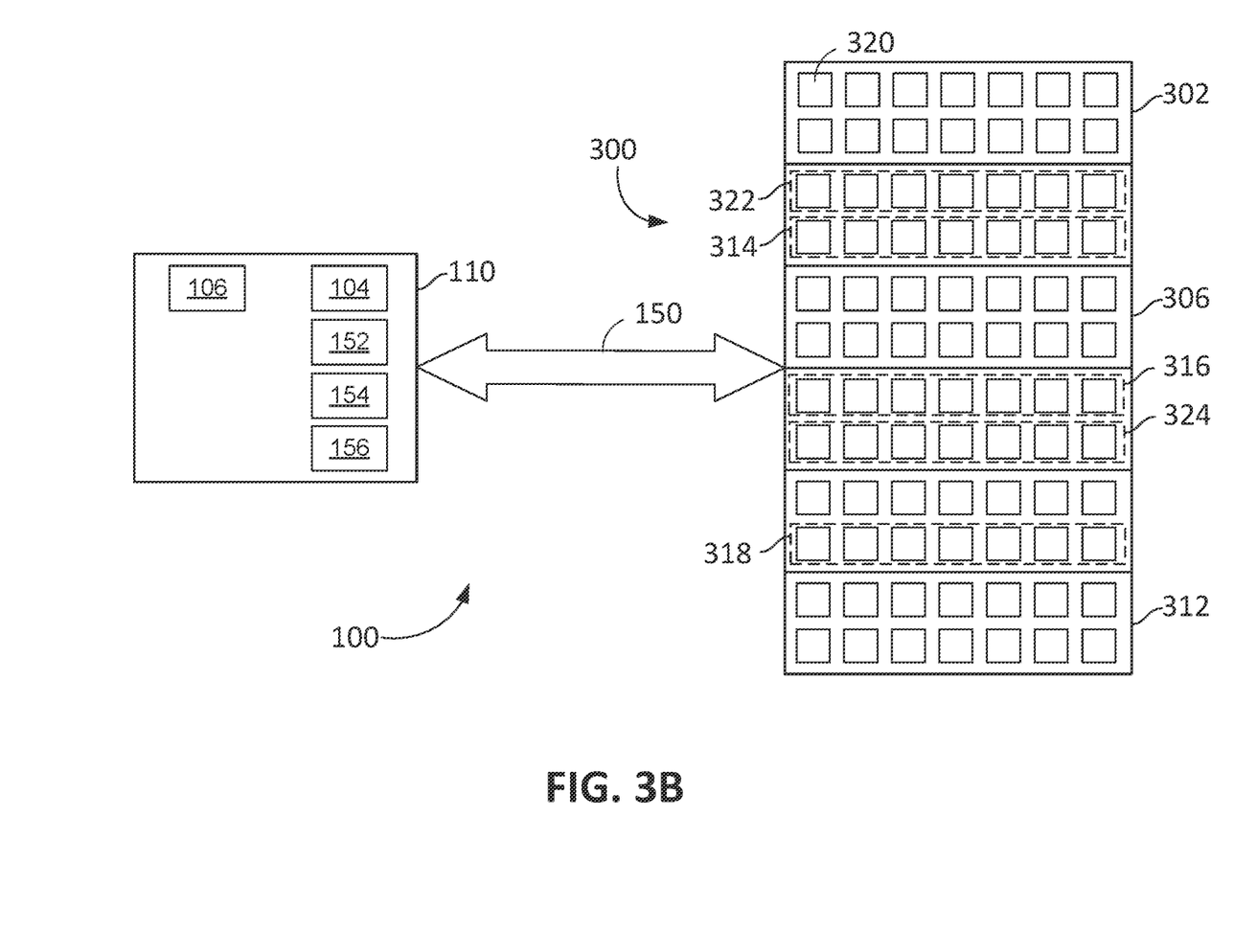
FIG. 3B is a block diagram of an input device illustrating regions of a sensing area, according to one or more embodiments.

FIG. 3B is similar to the embodiment of FIG. 3A, but depicts partial guarding. Similar to FIG. 3A, the sensor circuitry 104 drives the sensor electrodes 320 of one or more active regions of the regions 302-312 with sensing signals and receives corresponding resulting signals from the active regions to detect the presence and position of input object 140. The sensor circuitry 104 also receives signals from one or more noise measurement regions to measure noise.

When partial guarding is employed, only sensor electrodes adjacent or near to the active region(s) are driven with the guard signal. For example, if the active region is region 306, the guard signal is applied to sensor electrodes in rows 314 and 316. As another example, if the active region is region 312, the guard signal is applied to the sensor electrodes in row 318. Partial guarding, like full guarding, reduces interference cause by unwanted capacitive coupling. In another embodiment, non-adjacent sensor electrodes are driven with the guard signal. For example, if the active region is 306, the guard signal is applied to sensor electrodes in rows 322 and 324.

Figure 4A:
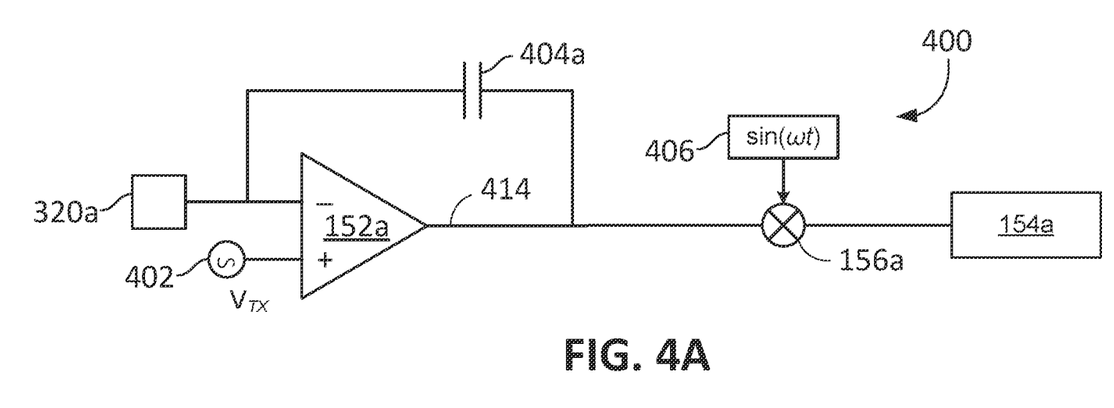
FIG. 4A is a schematic block diagram of an arrangement for performing capacitive sensing, according to one or more embodiments.
Figure 4B:
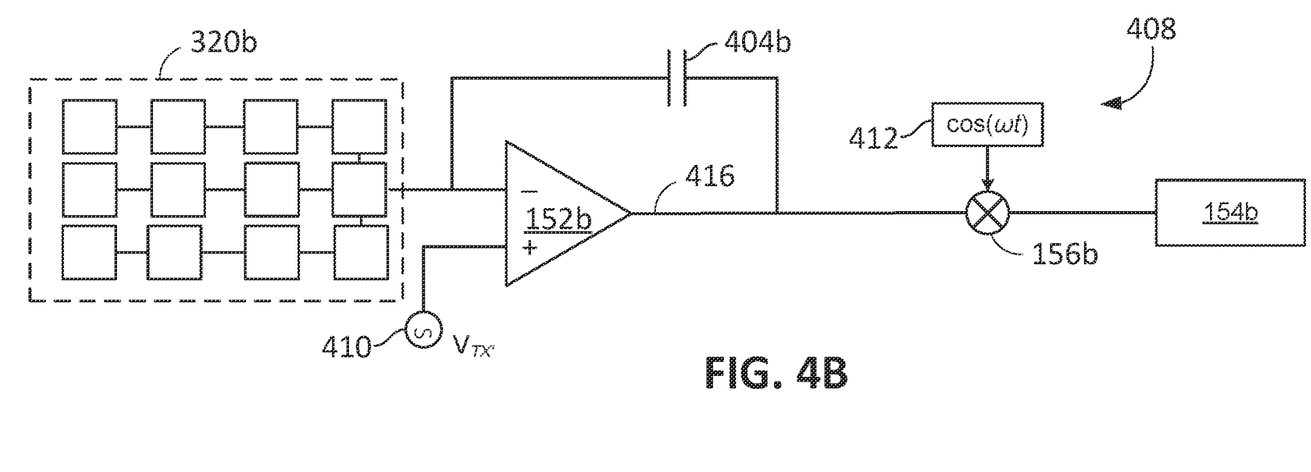
FIG. 4B is a schematic block diagram of an arrangement for performing noise measurement, according to one or more embodiments.

FIG. 4A and FIG. 4B illustrate examples of arrangements including the AFEs 152 interfaced to various sensor electrodes 320 and other components such as the ADCs 154 and mixers 156. The exemplary circuits of FIG. 4A and FIG. 4B are used, respectively, to drive portions of a sensing area, such as the regions 302-312 or portions of regions 302-312, to receive resulting signals for capacitive sensing of one or more input objects; and to receive resulting signals for making noise measurements.

The arrangement 400 of FIG. 4A represents a sensor circuit for driving electrode 320a with sensing signals 402, shown as $V_{TX}$. The circuit of FIG. 4A is used to determine presence and location of an input object, such as input object 140. The AFE 152a is electrically connected to the sensor electrode 320a via, for example traces 150 (not shown). An output 414 of the AFE 152a is electrically connected to the mixer 156a. The mixer 156a is in turn electrically connected to the ADC 154a. Feedback capacitor 404a facilitates driving the sensor electrode 320a with the sensing signals 402, e.g., $V_{TX}$. It will be appreciated that the particular configuration of AFE 152a is shown for purposes of illustration in FIG. 4A. Other configurations of AFEs and associated circuitry for driving sensor electrodes can be used without departing from the intended scope of the systems and methods disclosed herein.

An input object, e.g., the input object 140, in proximity to the sensor electrode 320a causes a change in the signal at the input of AFE 152a, which results in corresponding resulting signals at the output 414 of AFE 152a. The resulting signals are mixed with a mixer signal 406, illustratively depicted by signal $\sin(\omega t)$. In certain embodiments, the mixer signal 406 is in-phase with sensing signals 402 ($V_{TX}$). More particularly, to account for phase delays from $V_{TX}$ to the output 414 of AFE 152a, in certain embodiments, the mixer signal 406 is in-phase with the output 414. Placing the mixer signal in-phase with the sensing signals 402 or output 414 maximizes receipt of signals generated from input object detection and resulting signal at the output 414 of the AFE 152a. The combination of the resulting signals at the output of the AFE 152a and the mixer signal 406 is referred to herein as a mixed signal.

It will be appreciated that the mixer signal 406 is illustrated as $\sin(\omega t)$ by way of example only. Non-sinusoidal waveforms, such as rectangular, triangular, and sawtooth waveforms (to name a few), can be used without departing from the scope of the embodiments described herein.

Typically, capacitive sensing involves driving a plurality of electrodes with the sensing signals during a given time period. For example, capacitive sensing may involve driving an entire row or a plurality of rows with the sensing signals, e.g., one or more regions of regions 302-312 (FIGS. 3A-3B). In the case of absolute capacitive sensing, the circuit as shown in FIG. 4A may be repeated for each sensing electrode under measurement during a given sensing period, e.g., a one-to-one correspondence of AFE 152a to electrode 320. It will, however, be appreciated that the processing system 110 need not have a one-to-one relationship of AFEs to sensing electrodes in a sensing area. For example, multiplexers may be used to provide measurement of different regions of an input device 100 during different periods. For example, in the case of FIGS. 3A-3B, a 6:1 MUX may be used assuming a single region is to be measured during a particular time period FIG. 4B illustrates an arrangement 408 for measuring noise present in a device, such as the input device 100. The arrangement of FIG. 4B represents a noise measurement circuit for measuring noise in a portion of the input device 100 such as one or more of regions 302-312 (FIGS. 3A-3B).

The arrangement 408 of FIG. 4B is in general similar to the arrangement 400 of FIG. 4A. For example, the arrangement 408 includes AFE 152b, ADC 154b and signals 410 referred to as $V_{TX}$. In the arrangement 408, however, a plurality of sensor electrodes 320b are ganged together and connected to the input of AFE 152b as generally shown. The plurality of sensor electrodes 320b may include the plurality of electrodes 320 in one or more regions as shown in FIGS. 3A-3B, but is typically a region or regions different than the active region or channels, e.g., different than the sensor electrodes being actively subjected to capacitive sensing. Ganging of the plurality of sensor electrodes 320b as shown in FIG. 4B detects and measures noise at the plurality of sensor electrodes 320b for which positional information is unnecessary. Because the sensor electrodes 320b can be ganged together, a one-to-one relationship between the AFE and the sensor electrodes is not necessary, e.g., a many-to-one relationship exists between the sensor electrodes 320b and the AFE 152b.

In certain embodiments, such as when full guarding is used (FIG. 3A), the signal 410 ($V_{TX'}$) is the guard signal and may be the same as the sensing signals 402. However, as described above, the guard signal may be any signal having at least one characteristic selected from the group of amplitude, phase, and frequency in common with the capacitive sensing signal. In other embodiments, such as when partial guarding is used (FIG. 3B), the signal 410 is not the guard signal and may be a constant reference signal, such as a constant voltage or ground. When partial guarding is used, the guard signal is applied to regions or portions of regions directly adjacent to electrodes in the active channel, e.g., region under capacitive sensor measurement as previously described.

Mixer signal 412, illustratively shown as waveform cost ($\omega t$), is configured to minimize energy from the driving waveform, e.g., sensing signals 402 (FIG. 4A). For example, the mixer signal 412 is out-of-phase with sensing signals 402 (or the output 414 of AFE 152a). Thus, the mixer signal 412 is out-of-phase with the mixer signal 406. As a more specific example, the mixer signal 412 is orthogonal to the mixer signal 406 and/or an output 416 of the AFE 152b, e.g., 90° out-of-phase with the mixer signal 406 and/or the output 416. In certain embodiments, the mixer signal 412 may be obtained by integrating the mixer signal 406. It will be appreciated that the mixer signal 412 may be not perfectly orthogonal to an incoming energy from sensing signals. Such non-orthogonality can be used to create a baseline noise measurement, which can then be subtracted by processing system 110 from noise measurements made via ADC 154b to determine an actual noise level.

Because the mixer signal 412 is out-of-phase with the mixer signal 406, the noise measurement circuit 408 minimizes any resulting signals from $V_{TX}$ and, therefore, generally facilitates detection of in-band noise. However, because the mixer signal 412 minimizes resulting signals from $V_{TX}$, the noise measurement circuit 408 may not detect in-band noise that is in-phase with $V_{TX}$. To address in-band noise that is in-phase with $V_{TX}$, the mixer signal 406 (and sensing signals 402) and the mixer signal 412 can be phase shifted during each sensing period. For example, in a first sensing period, the mixer signal 406 is represented by $\sin(\omega t)$ and the mixer signal 412 represented by $\cos(\omega t)$. During a second sensing period, the mixer signal 406 is shifted to $\cos(\omega t)$ and the mixer signal 412 is shifted to $\sin(\omega t)$. Shifting the phase of the mixer signals 406, 412 and sensing signals 402 facilitates measurement of noise that would otherwise be in-phase with a sensing signal having a constant phase.

Similar to the mixer 406, it will be appreciated that the mixer 412 is illustrated as $\cos(\omega t)$ by way of example only. Non-sinusoidal waveforms, such as rectangular, triangular, and sawtooth waveforms (to name a few), can be used without departing from the scope of the embodiments described herein.

Figure 5:
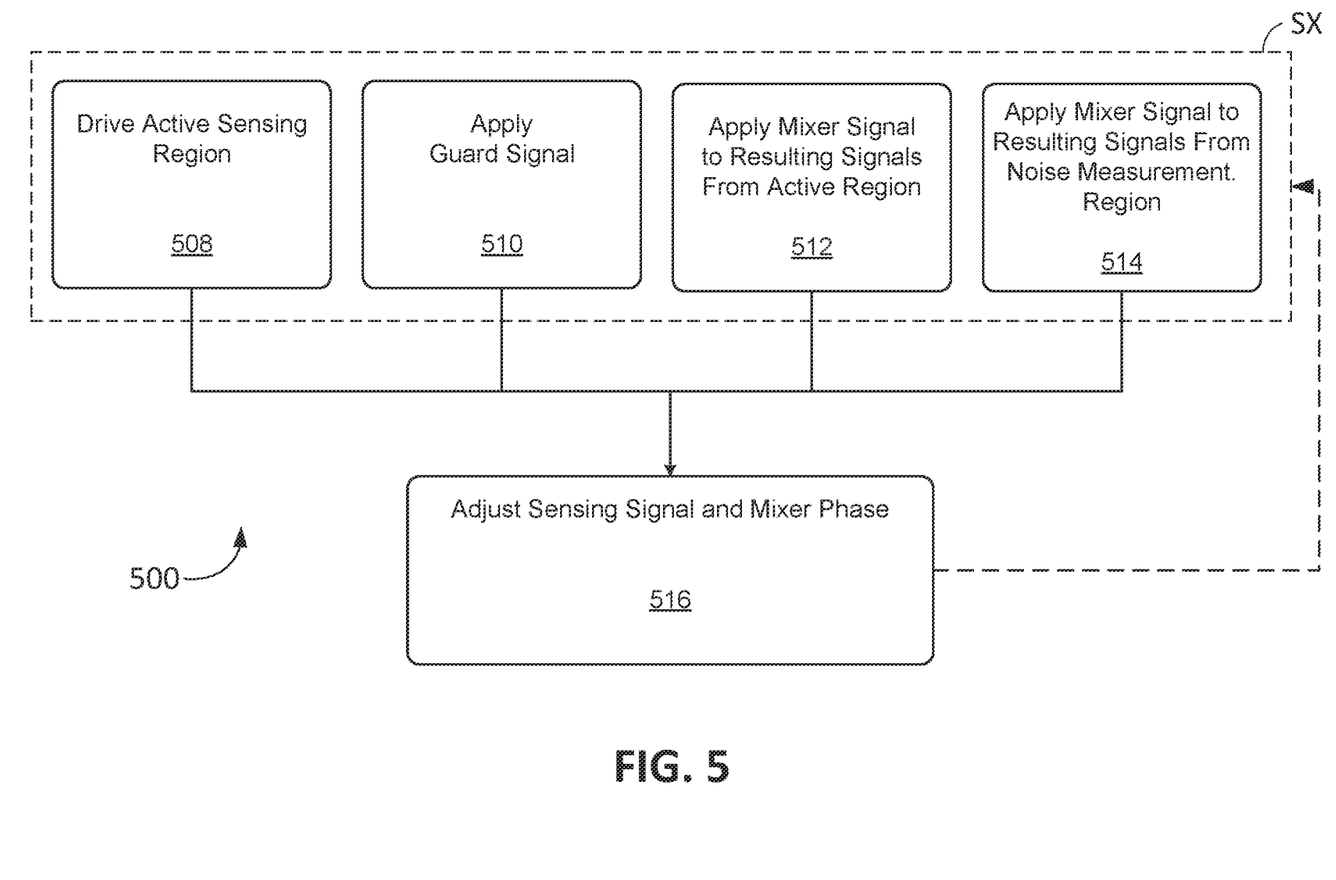
FIG. 5 illustrates a method for performing capacitive sensing and noise measurement, according to one or more embodiments.

FIG. 5 illustrates a method 500 used for capacitive sensing to detect presence and position of one or more input objects while simultaneously detecting noise and optionally using partial or full guarding. The method of FIG. 5 will be described with respect one complete noise measurement cycle of two noise measurement regions, e.g., a noise measurement period. The noise measurement period coincides with capacitive sensing of two active regions, e.g., two sensing periods. As will be apparent, blocks 508-514 may occur simultaneously during one sensing period labelled SX.

The method 500, referred to as serial IQ noise measurement, will be described with continuing references to FIGS. 3A-3B and FIGS. 4A-4B.

As shown in block 508, sensor electrodes are driven with sensing signals in one or more regions (active region(s)) to detect the presence and location of an input object in a portion of the sensing area. For example, a plurality of sensor electrodes 320a in the first region 302 of the sensing area 300 (FIGS. 3A-3B) are driven with the sensing signals 402 during a first sensing period using the arrangement in FIG. 4A.

In block 510, during the first sensing period, a guard signal is optionally applied to guard electrodes. In certain embodiments, when partial guarding is used, the guard signal is applied to the plurality of sensor electrodes 320 immediately adjacent or near to the active region 302, e.g., the sensor electrodes 320 in row (channel) 322 are driven with the guard signal (FIG. 3B). In other embodiments, when full guarding is employed, all electrodes 320 in the remaining regions (e.g., inactive regions) are driven with the guard signal. Thus, the guard signal is applied to the sensor electrodes 320 in regions 304-312 (FIG. 3A). As previously described, the guard signal may be the same as the sensing signals 402 or may be a signal having one or more characteristics selected from the group of a common amplitude, a common phase, or a common frequency as the sensing signals 402.

At block 512, a first mixer signal is applied to resulting signals received from the active region during the first sensing period. For example, the mixer signal 406 is applied via the mixer 156a to the resulting signals for region 302 as shown in FIG. 4A. The mixer signal 406 is in-phase with the sensing signals 402 (or, to account for delay, the output 414 of the AFE 152a) and, therefore, maximizes the resulting signals generated from, for example, an input object in region 302. The mixed signal is then received at ADC 154a and processed. As previously described, the arrangement of FIG. 4A may include a separate AFE for each sensor electrode 320a in the active region. Signals from the ADCs are processed and used to determine, for example, whether an input object is present and, if so, its positional information. The signals from the ADCs may, for example, be processed to form part of a capacitive image.

In block 514, a second mixer signal is applied to resulting signals received from one or more noise measurement regions during the first sensing period. For example, the mixer signal 412 is applied via the mixer 156b to resulting signals from regions 306 and 308 (FIGS. 3A-3B). The mixer signal 412 is out-of-phase with the mixer signal 406 and, therefore, minimizes energy generated from, for example, the sensing signals 402. Other energy, such as random noise, is not minimized by the mixer signal 412 provided it is out-of-phase with the sensing signals 402 (or the output 414 of the AFE 152a). Such mixed signal is received at the ADC 154b and the level of noise in regions 306 and 308 may be determined. As previously described, the sensor electrodes, e.g., sensor electrodes 320b, in the regions under noise measurement may be ganged together. In embodiments employing partial guarding, the signal 410 ($V_{TX'}$) is ground or a constant reference voltage. In embodiments employing full guarding, the signal 410 is the same as sensing signals 402.

If noise is detected, the noise can be measured and the effect of noise can be mitigated when necessary. Any appropriate metrics can be used to determine if mitigation is appropriate.

For example, if the detected level of noise is less than 5% of the typical input object level, the determination circuit 106 may determine mitigation is unnecessary. If the detected level of noise is about 5 to 10% of the typical input object level, some degradation of positional information may occur, but the determination circuit 106 may determine that no mitigation is necessary. Alternatively, if the detected level of noise is 5 to 10% of the typical input object level, the determination circuit 106 may determine that mitigation is necessary. If the detected level of noise is greater than 10% of the typical input object level, the determination circuit 106 may determine that noise mitigation is appropriate. It will be understood that the foregoing metrics are used by way of illustration and any appropriate metrics are used to determine when mitigation may be appropriate.

As one example of noise mitigation, if the detected level of noise reaches a threshold, the effect of noise is mitigated by changing a frequency of the sensing signal. As another example, if the detected level of noise reaches a threshold, a capacitive image obtained can be disregarded.

At block 516, the phase of the sensing signals 402 and the mixer signal 406 are phase shifted by, for example 90°. For example, if the mixer signal 406 as discussed in block 510 above was represented by sin(ωt), the mixer signal 406 is shifted 90° and now represented by cos(ωt). The mixer signal 412 is likewise phase shifted. For example, if the mixer signal 412 was represented as cos(ωt), the mixer signal 412 is phase shifted 90° and now represented by sin(ωt).

The active region then advances to a next region, for example, to the region 304 (FIGS. 3A-3B) for measurement during a second sensing period. The process then generally repeats with the regions under noise measurement remain unchanged. For example, at block 508, during the second sensing period a plurality of electrodes 320 in the second region 304 of sensing area 300 (FIGS. 3A-3B) are driven with sensing signals 402 (FIG. 4A) with the shifted phase. A full or partial guard signal may be applied during the second sensing period as previously described.

At block 512, the first mixer signal 406 with shifted phase is applied to resulting signals received from the current active region, the region 304, during the second sensing period. For example, the mixer signal 406 with shifted phase is applied via mixer 156a to resulting signals for region 304 as shown in FIG. 4A. The mixer signal 406 (e.g., now cos(ωt)) is in-phase with the sensing signals 402 (or, to account for delay, the output 414 of the AFE 152a) and, therefore, maximizes the resulting signal generated from, for example, an input object in region 304. The mixed signal is then received at ADC 154a and processed as previously described.

At block 514, during the second sensing period, the second mixer signal 412 with shifted phase is applied to resulting signals received from the same noise measurement regions as during the first sensing period. For example, the mixer signal 412 applied via mixer 156b to resulting signals for the regions 306 and 308. The mixer signal 412 remains out-of-phase with the mixer signal 406 and, therefore, minimizes any energy generated from, for example, the sensing signals 402. Other energy, such as random noise, is not minimized provided the noise is out-of-phase with the sensing signals 402. Such mixed signal is received at the ADC 154a and used to determine, e.g., measure, the level of noise during the second sensing period.

If noise is detected, the effect on noise can be mitigated when necessary, as previously described. The second iteration of steps 508-514 completes a second sensing period and completes one noise measurement period.

After input capacitive sensing occurs in region 304, the active region then advances to region 306 (FIGS. 3A-3B) for measurement during a third sensing period. However, during the third sensing period, the noise measurement regions change to different regions, e.g., regions 302 and 312 (FIGS. 3A-3B). The method of FIG. 5 may then be repeated as previously described until capacitive sensing is carried out on all regions of the sensing area, e.g., a capacitive frame, and all other regions are measured for noise.

It will be appreciated that due to phase shift of sensing signals 402 and corresponding phase shift of the mixer signal 406 and the mixer signal 412, in-band noise will be detected even if the noise is in-phase with sensing signals 402. In the above sequence, for example, the noise in regions 306 and 308 may go undetected when the noise measurement is made during the first sensing period. However, the noise in regions 306 and 308 will be detected when the phase of the sensing signals 402, mixer signal 406 and mixer signal 412 are shifted during the second sensing period.

It will be understood that the particular regions used for noise measurement during sensing of a particular region were provided in the description above by way of example. For example, during sensing of region 302, any combination of regions 304-312 can be used for noise measurement, e.g., regions 304 and 306, 306 and 308, 308 and 310, or 310 and 312 are appropriate for noise measurement during sensing of region 302. Further, the regions selected for noise measurement during a particular sensing period need not be adjacent regions. Typically, however, regions in the sensing area are measured for noise twice during a particular capacitive sensing frame, e.g., once at each phase of the sensing signal.

Figure 6:
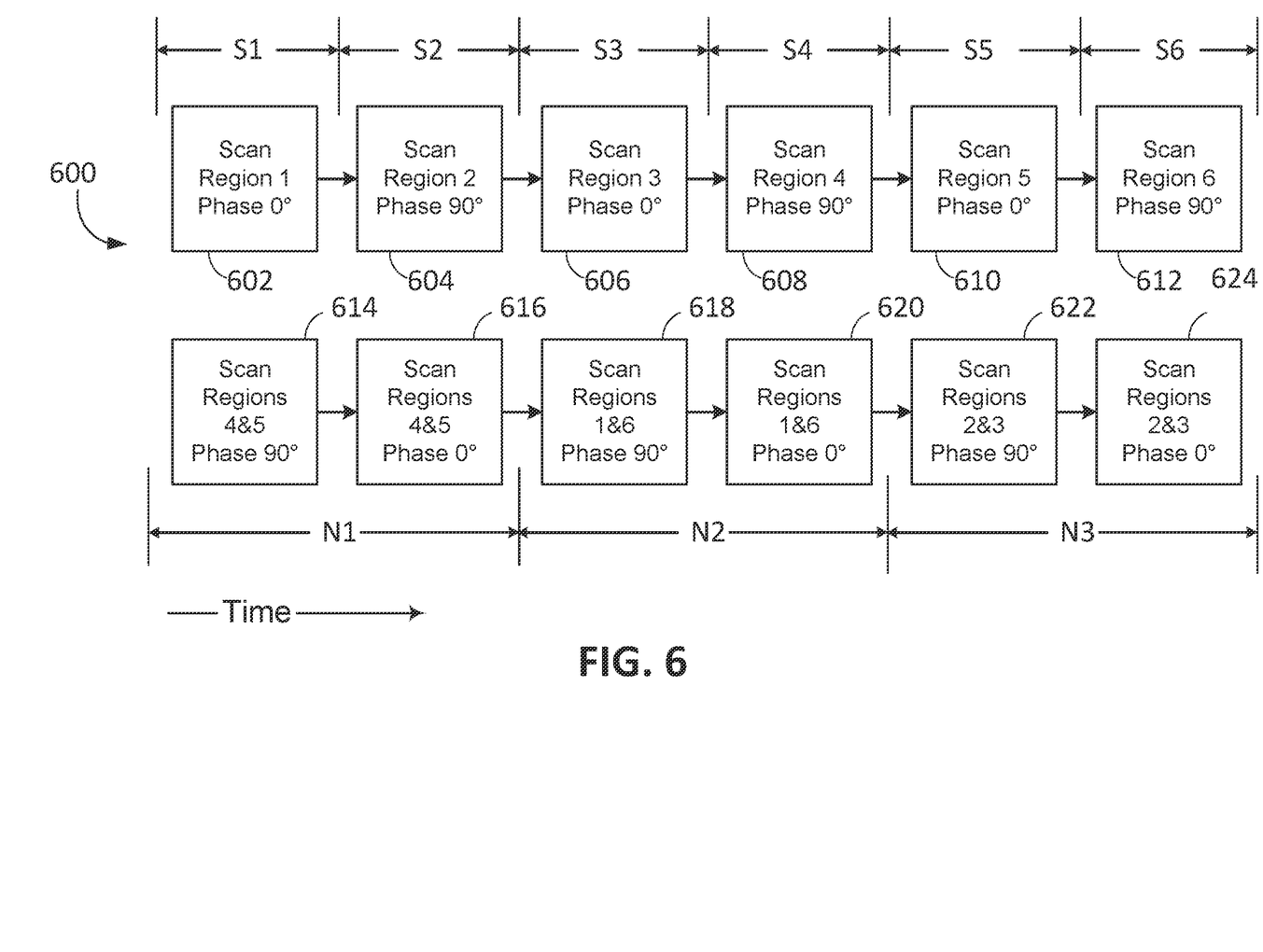
FIG. 6 illustrates a sequence for performing capacitive sensing and noise measurement across a sensing area, according to one or more embodiments.

FIG. 6 illustrates an example of a sequence 600 to sense a capacitive frame of a sensing area for an input object and to measure noise of the sensing area using the serial IQ noise measurement as previously described. The sequence 600 will be described with continuing reference to FIGS. 3A-5.

For purposes of illustration, the sequence 600 reflects a sensing area comprising six regions, each region having a plurality of sensor electrodes consistent with the embodiment of FIGS. 3A-3B. Six sensing periods, labelled S1-S6, with one sensing period corresponding to each region 302-312 in the sensing area 300 are shown. The sensing periods may be a same time length or a different time length. FIG. 6 also shows three noise measurement periods, labelled N1-N3. In the example, each noise measurement period corresponds to two sensing periods to allow noise measurements to be taken for a set of two regions during two sensing periods according to the method of FIG. 5. For example, one noise measurement is taken with the sensing signals 402 having a first phase and a second noise measurement is taken with the sensing signals 402 having a second phase. In each case, the second mixer signal 412 is out-of-phase with the first mixer signal 406.

As shown, scan 602 of region 1 (FIGS. 3A-3B, 302) is made during sensing period S1 with the sensing signals 402. The mixer signal 406 is in-phase with the sensing signals (or the output 414 of AFE 152a) and for reference has a phase of 0°. During the scan of region 1, noise measurement 614 is made at regions 4 and 5 (FIGS. 3A-3B, 308-310). The second mixer signal 412 for the noise measurement region is out-of-phase with the first mixer signal 406, e.g., the second mixer has a phase of 90°. Subsequently, a scan 604 is made of region 2 (FIGS. 3A-3B, 304) during sensing period S2. For the scan 604 of region 2, the phase of the sensing signals 402 and the mixer signal 406 are shifted to 90°. Noise measurement 616 occurring during scan 604 continues in regions 4 and 5; however, the mixer signal 412 in the noise measurement circuit is shifted to 0°. This process illustrates a first cycle of capacitive scan of two scan regions (regions 1 and 2) during two sensing periods S1, S2 and noise measurement of two regions (regions 4 and 5) during one noise measurement period N1.

Continuing with the example, scan 606 of region 3 (FIG. 3A-3B, 306) is made during sensing period S3 with the sensing signals 402 and the mixer signal 406 taken, for example, at their initial phase, e.g., the mixer signal 406 at a phase of 0°. During the scan 606 of region 3, noise measurement 618 is made at regions 1 and 6 (FIGS. 3A-3B, 302, 312). The second mixer signal 412 for the noise measurement regions 1 and 6 is out-of-phase with the mixer 406, e.g., the second mixer signal 412 has a phase of 90°. Subsequently, a scan 608 is made of region 4 (FIGS. 3A-3B, 308) during sensing period S4. For the scan 608 of region 4, the phase of the sensing signals 402 and the mixer signal 406 are shifted, e.g., the mixer signal 406 phase is shifted to 90°. Noise measurement 620 occurring during scan 608 continues at regions 1 and 6; however, the second mixer signal 412 in the noise measurement circuit is shifted to 0°. This process illustrates a second cycle of capacitive scan of two scan regions (regions 3 and 4) during two sensing periods S3, S5 and noise measurement of two regions (regions 1 and 6) during one noise measurement period N2.

Continuing further with the example, scan 610 of region 5 (FIGS. 3A-3B, 310) during sensing period S5 is made with the sensing signals 402 and the mixer signal 406 at, for example, their initial phase, e.g., the mixer signal 406 is at a phase of 0°. During the scan 610 of region 5, noise measurement 622 is made at regions 2 and 3 (FIGS. 3A-3B, 304-306). The second mixer signal 412 for the noise measurement regions is out-of-phase with the mixer signal 406, e.g., the second mixer signal 412 has a phase of 90°. Subsequently, a scan 612 is made of region 6 (FIGS. 3A-3B, 312) during sensing period S6. For the scan 612 of region 6, the phase of the sensing signals and the mixer signal 406 are shifted. For example, the phase of the mixer signal 406 is shifted to 90°. Noise measurement 624 occurring during scan 612 continues at regions 2 and 3; however, the second mixer signal 412 in the noise measurement circuit is shifted to 0°. This process illustrates a third cycle of capacitive scan of two scan regions (regions 5 and 6) during two sensing periods S5, S6 and noise measurement of two regions (regions 2 and 3) during one noise measurement period N3.

The use of the terms "a" and "an" and "the" and "at least one" and similar referents in the context of describing the invention (especially in the context of the following claims) are to be construed to cover both the singular and the plural, unless otherwise indicated herein or clearly contradicted by context. The use of the term "at least one" followed by a list of one or more items (for example, "at least one of A and B") is to be construed to mean one item selected from the listed items (A or B) or any combination of two or more of the listed items (A and B), unless otherwise indicated herein or clearly contradicted by context. The terms "comprising," "having," "including," and "containing" are to be construed as open-ended terms (i.e., meaning "including, but not limited to,") unless otherwise noted. Recitation of ranges of values herein are merely intended to serve as a shorthand method of referring individually to each separate value falling within the range, unless otherwise indicated herein, and each separate value is incorporated into the specification as if it were individually recited herein.

All methods described herein can be performed in any suitable order and/or simultaneously unless otherwise indicated herein or otherwise clearly contradicted by context. The use of any and all examples, or exemplary language (e.g., "such as") provided herein, is intended merely to better illuminate the invention and does not pose a limitation on the scope of the invention unless otherwise claimed. No language in the specification should be construed as indicating any non-claimed element as essential to the practice of the invention.

Example embodiments are described herein. Variations of those embodiments will become apparent to those of ordinary skill in the art upon reading the foregoing description. The inventors expect skilled artisans to employ such variations as appropriate, and the inventors intend for the invention to be practiced otherwise than as specifically described herein. Accordingly, this invention includes all modifications and equivalents of the subject matter recited in the claims appended hereto as permitted by applicable law. For example, although generally described for use as a capacitive sensor, the described arrangement may be used to with other sensing technologies. Moreover, any combination of the above-described elements in all possible variations thereof is encompassed by the invention unless otherwise indicated herein or otherwise clearly contradicted by context.

The invention claimed is:

1. A method for operating sensor electrodes in an input device, comprising:
   driving, during a first sensing period, a first plurality of sensor electrodes with first sensing signals;
   receiving first resulting signals from the first plurality of sensor electrodes and mixing the first resulting signals with a first mixer signal to generate a first mixed signal, wherein the first mixer signal has a first phase and the first mixed signal corresponds to at least a portion of a capacitive image;
   receiving second resulting signals from a second plurality of sensor electrodes and mixing the second resulting signals with a second mixer signal to generate a second mixed signal, wherein the second mixer signal has a second phase and the second mixed signal corresponds to a first noise measurement.

2. The method according to claim 1, wherein the second phase of the second mixer signal is out-of-phase with the first phase of the first mixer signal.

3. The method according to claim 1, further comprising:
   shifting the first phase of the first mixer signal;
   shifting the second phase of the second mixer signal;
   driving, during a second sensing period, a third plurality of sensor electrodes with second sensing signals, wherein the second sensing signals are shifted in phase as compared to the first sensing signals;
   receiving third resulting signals from the third plurality of sensor electrodes and mixing the third resulting signals with the first mixer signal having the shifted first phase to generate a third mixed signal, wherein the third mixed signal corresponds to at least a further portion of the capacitive image;
   receiving fourth resulting signals from the second plurality of sensor electrodes and mixing the fourth resulting signals with the second mixer signal having the shifted second phase to generate a fourth mixed signal, wherein the fourth mixed signal corresponds to a second noise measurement.

4. The method according to claim 1, further comprising: driving a plurality of guard electrodes with a guard signal, wherein the guard signal has at least one selected from the group consisting of an amplitude, a frequency, and a phase in common with the first sensing signals.

5. The method according to claim 4, wherein the plurality of guard electrodes comprises one or more electrodes adjacent to the first plurality of sensor electrodes.

6. The method according to claim 4, wherein the plurality of guard electrodes comprises the second plurality of sensor electrodes.

7. The method according to claim 1, wherein a number of electrodes in the second plurality of sensor electrodes is larger than a number of electrodes in the first plurality of sensor electrodes.

8. A processing system, comprising:
    a sensor circuit configured to:
        drive, during a first sensing period, a first plurality of sensor electrodes with first sensing signals;
        receive first resulting signals from the first plurality of sensor electrodes, and
        mix the first resulting signals with a first mixer signal to generate a first mixed signal, wherein the first mixer signal has a first phase and the first mixed signal corresponds to at least a portion of a capacitive image;
    a noise measurement circuit configured to:
        receive second resulting signals from a second plurality of sensor electrodes, and
        mix the second resulting signals with a second mixer signal to generate a second mixed signal, wherein the second mixer signal has a second phase and the second mixed signal corresponds to a first noise measurement.

9. The processing system according to claim 8, wherein the second phase of the second mixer signal is out-of-phase with the first phase of the first mixer signal.

10. The processing system according to claim 8, wherein the processing system is further configured to:
    shift the first phase of the first mixer signal;
    shift the second phase of the second mixer signal;
    drive, during a second sensing period, a third plurality of sensor electrodes with second sensing signals, wherein the second sensing signals are shifted in phase as compared to the first sensing signals;
    receive third resulting signals from the third plurality of sensor electrodes and mix the third resulting signals with the first mixer signal having the shifted first phase to generate a third mixed signal, wherein the third mixed signal corresponds to at least a further portion of the capacitive image; and
    receive fourth resulting signals from the second plurality of sensor electrodes and mix the fourth resulting signals with the second mixer signal having the shifted second phase to generate a fourth mixed signal, wherein the fourth mixed signal corresponds to a second noise measurement.

11. The processing system according to claim 8, wherein the processing system is further configured to:
    drive a plurality of guard electrodes with a guard signal, wherein the guard signal has at least one selected from the group consisting of an amplitude, a frequency and a phase in common with the first sensing signals.

12. The processing system according to claim 8, wherein the sensor circuit comprises at least one analog front end coupled to at least one electrode of the first plurality of sensor electrodes and wherein the first mixer signal is in-phase with an output of the at least one analog front end.

13. The processing system according to claim 8, wherein the noise measurement circuit comprises at least one analog front end coupled to two or more of the second plurality of sensor electrodes, wherein the two or more of the second plurality of sensor electrodes and ganged together.

14. An input device, comprising:
    a sensing area comprising a plurality of sensing regions; and
    a sensor circuit configured to:
        drive, during a first sensing period, a first plurality of sensor electrodes in a first sensing region of the plurality of sensing regions with first sensing signals;
        receive first resulting signals from the first plurality of sensor electrodes, and
        mix the first resulting signals with a first mixer signal to generate a first mixed signal, wherein the first mixer signal has a first phase and the first mixed signal corresponds to at least a portion of a capacitive image; and
    a noise measurement circuit configured to:
        receive second resulting signals from a second plurality of sensor electrodes in a second sensing region of the plurality of sensing regions, and
        mix the second resulting signals with a second mixer signal to generate a second mixed signal, wherein the second mixer signal has a second phase and the second mixed signal corresponds to a first noise measurement.

15. The input device according to claim 14, wherein the second phase of the second mixer signal is out-of-phase with the first phase of the first mixer signal.

16. The input device according to claim 14, wherein the input device is further configured to:
    shift the first phase of the first mixer signal;
    shift the second phase of the second mixer signal;
    drive, during a second sensing period, a third plurality of sensor electrodes in a third sensing region of the plurality of sensing regions with second sensing signals, wherein the second sensing signals are shifted in phase as compared to the first sensing signals;
    receive third resulting signals from the third plurality of sensor electrodes and mix the third resulting signals with the first mixer signal having the shifted first phase to generate a third mixed signal, wherein the third mixed signal corresponds to at least a further portion of the capacitive image; and
    receive fourth resulting signals from the second plurality of sensor electrodes and mix the fourth resulting signals with the second mixer signal having the shifted second phase to generate a fourth mixed signal, wherein the fourth mixed signal corresponds to a second noise measurement.

17. The input device according to claim 14, wherein the input device is further configured to:
    drive a plurality of guard electrodes with a guard signal, wherein the guard signal has at least one selected from the group consisting of an amplitude, a frequency and a phase in common with the first sensing signals.

18. The input device according to claim 17, wherein the guard signals comprises one or more sensor electrodes from each sensing region of the plurality of sensing regions.

19. The input device according to claim 14, wherein the sensor circuit comprises at least one analog front end coupled to at least one electrode of the first plurality of sensor electrodes and wherein the first mixer signal is in-phase with an output of the at least one analog front end.

20. The input device according to claim 14, wherein the noise measurement circuit comprises at least one analog front end coupled to two or more of the second plurality of sensor electrodes, wherein the two or more of the second plurality of sensor electrodes and ganged together.

* * * * *